United States Patent [19]
Johnson et al.

[11] 3,726,969
[45] Apr. 10, 1973

[54] ACCELERATING THE LYSIS OF BLOOD CLOTS WITH UROKINASE AND A BENZYLAMINE DERIVATIVE

[75] Inventors: Robert Phillip Johnson, Jacksonville, Fla.; James Harold Short, Lake Forest, Ill.

[73] Assignee: Abbott Laboratories, North Chicago, Ill.

[22] Filed: June 9, 1971

[21] Appl. No.: 151,481

Related U.S. Application Data

[63] Continuation-in-part of Ser. No. 761,821, Sept. 23, 1968, abandoned.

[52] U.S. Cl. .....................424/94, 424/99, 424/330, 424/282
[51] Int. Cl. ..............................................A61k 19/00
[58] Field of Search..........................424/94, 99, 330, 424/282; 260/570.9

[56] References Cited

UNITED STATES PATENTS

| 3,019,167 | 1/1962 | Innerfield | 424/94 |
| 3,226,304 | 12/1965 | Siiteri | 424/94 |
| 3,294,641 | 12/1966 | Lorand | 424/94 |
| 3,344,028 | 9/1967 | Personeus et al | 424/94 |

OTHER PUBLICATIONS

Merck Index, 8th Edition, 1968, Page 138

*Primary Examiner*—Albert T. Meyers
*Assistant Examiner*—Daren M. Stephens
*Attorney*—Robert L. Niblack

[57] ABSTRACT

Benzylamine and simple ring-substituted derivatives thereof have been found to potentiate blood clot lysis induced by urokinase when a combination of urokinase and these (substituted) benzylamines are brought in contact with clots of blood from vertebrate animals.

10 Claims, No Drawings

ACCELERATING THE LYSIS OF BLOOD CLOTS WITH UROKINASE AND A BENZYLAMINE DERIVATIVE

CROSS-REFERENCE TO RELATED APPLICATIONS

This application is a continuation-in-part of co-pending application, Ser. No. 761,821, filed Sept. 23, 1968 now abandoned.

DETAILED DESCRIPTION OF THE INVENTION

This invention relates to novel compositions of matter involving the combination of urokinase and benzylamine or a ring-substituted benzylamine or salts thereof and to a method employing such compositions in order to accelerate the lysis of blood clots.

Urokinase is a complex protein of unknown structure which is found in human urine in trace amounts. It is an effective, but slowly acting blood clot lysing agent when injected in amounts far greater than those which exist naturally in urine. Methods of recovering urokinase from human urine are known, but because urokinase is present there only in minute amounts, its isolation from urine is extremely expensive. Furthermore, because relatively large amounts of urokinase are needed for the dissolution of a blood clot with this agent, the discovery of this activity for urokinase is only of research interest and has little practical value, unless agents are found which can be employed in conjection with urokinase in order to speed up the lysing process and reduce the amount of urokinase required to dissolve a blood clot.

For the purpose of the present invention, the term "urokinase" is meant to include that component or those components present in the blood vessels of vertebrate which exhibit the clot-lysing effect commonly ascribed to urokinase. Such components, whether similar in structure or totally different from urokinase, are thus to be understood as being included in the term "urokinase."

It is an object of the present invention to provide novel compositions of matter which when brought into contact with a vertebrate blood clot will materially accelerate the lysis of such a clot as compared to the use of urokinase alone for this purpose. Another object of this invention is to provide a method employing the novel compositions of matter herein disclosed which will decrease the cost and time of dissolving a blood clot. A further object is the process of lysing a blood clot by softening such a clot prior to treating it with urokinase. A still further object of this invention is the provision of a two-step treatment method for warm-blooded animals suffering from clot obstructions in their blood stream.

These and other objects are accomplished by providing a composition comprising urokinase and a nontoxic amount of a benzylamine of the formula:

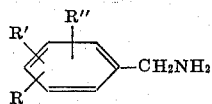

wherein R is hydrogen, halogen, methyl, trifluoromethyl or methoxy and R' is hydrogen, halogen, hydroxy, methoxy, methyl or trifluoromethyl and wherein R and R' together may form a second benzene ring fused to the phenyl ring at the 2- and 3-positions, or a methylenedioxy chain attached to the phenyl ring at the 3- and 4-positions and wherein R'' is methoxy when R and R' both are methoxy or hydroxy and hydrogen in all other instances or a water-soluble, non-toxic acid addition salt thereof. These benzylamines may enhance the effect of urokinase on a blood clot by softening the clot and making it easier for urokinase to act thereon and promoting lysis of the clot in a much shorter period of time, or they may effect an inhibitor of the urokinase activity in the blood. The empirical fact is that the amount of urokinase required for clot lysing is drastically reduced when combined with one of the above benzylamines. The dramatic effect obtained by the disclosed combination of reagents can be demonstrated both in vitro and in vivo. Particularly effective are the combinations of urokinase with a benzylamine carrying one of the above-named substituents in the 2-position and/or the 4-position and those wherein both R and R' are different from hydrogen.

The exact amount of benzylamine potentiator employed per unit of urokinase is not critical; good results are obtained when at least 0.1 micromoles of one of the above benzylamines is employed per CTA unit of urokinase activity. (One CTA urokinase unit is the standard unit of urokinase activity established by the National Heart Institute Committee on Thrombolytic Agents; Fletcher, et al., J. Lab. Clin. Med. 65, 713–31, May 1965). Most effective results are observed with ratios of benzylamine to urokinase between 0.2 and 5.0 micromoles per CTA unit. The combination of these agents may be employed as such or the blood clot can be treated first with the benzylamine and then with a urokinase solution, optionally followed with additional benzylamine. The upper limit of the benzylamine derivative in the above ratio may be exceeded where the toxicity of the specific benzylamine derivative is particularly low.

The invention is more clearly understood by reference to the following examples which show the surprising and unexpected results obtained with the new compositions. These examples, however, are illustrations only and are not to be construed as restrictive.

EXAMPLES 1–32

The experiment to determine the activity of the new composition was carried out as follows: human fribinogen labeled with radioactive iodine $I^{125}$ was prepared by the method of Rosa, et al., Biochim. Biophys. Acta 86, 519 (1964). A solution of this fibrinogen was added to human plasma obtained by known methods. The well-stirred mixture was divided into 1.0 ml. aliquots in test tubes. The labeled fibrinogen was converted to fibrin clots by adding thrombin to each tube and immediately spinning a ground glass rod in each mixture for 15 seconds. The formed clots adhered to the glass rods and were allowed to age approximately 1 hour; they were then freed of serum by pressing them against the walls of the test tubes. The clots were stored on the glass rods in their own serum at −20° C. until needed.

It is known that each batch of pooled plasma and of fibrin clots differs in susceptibility to activation of the fibrinolytic system by urokinase. It was, therefore, necessary to standardize each batch individually. This was accomplished as follows: to a series of test tubes was added 1.5 ml. of human plasma and 0.1 ml. of urokinase solutions varying in concentrations from 0 to 500 CTA units per ml. One of the $I^{125}$ labeled fibrin clots described above was added to each tube and the tubes were incubated for 20 hours at 37° C. with gentle shaking. The plasma was then freed of any solid clot particles and measured for its $I^{125}$ content. Maximum possible lysis was established by measuring total radioactivity present in the solution after digesting control clots with sodium hydroxide. The degree of lysis brought about by urokinase solutions was then determined as stated and expressed as the percentage of the maximum possible radioactivity which can be solubilized with sodium hydroxide. The concentration of the various urokinase solutions used was plotted against the percent lysis they caused and that concentration of urokinase which effected about 10 percent lysis under these conditions was determined from the resulting graph. Usually, this concentration falls within the range of from 150 to 400 CTA units/ml. of urokinase solution.

For evaluation of fibrinolytic enhancement, 0.1 ml. of the urokinase solution which produces approximately 10 percent lysis was added to 1.5 ml. of plasma containing 1.5 mg. (about 6–10 micromoles) of the substituted benzylamine hydrochloride defined above. Incubation with the labeled clot and determination of percent lysis was carried out as described above. Each compound of the above benzylamine series was tested in duplicate and two tubes without added test compounds were run simultaneously to serve as a control. The following table shows the results obtained. In each case, the percent lysis for urokinase alone and for urokinase together with the test compound are given. The two values given under each heading represent the percentages obtained in each of the two duplicate experiments. Maximum possible lysis is 100 percent and, as seen from the attached table, the lysis percentage values for urokinase with test compound are far above the values obtained with the same concentration of urokinase alone.

| | Test Compound R—$CH_2NH_2 \cdot HCl$ | | Urokinase With test compound: | Without test compound: |
|---|---|---|---|---|
| Ex. No. | R= | m.p.(°C) of HCl salt | % Lysis | % Lysis |
| 1 | Phenyl | 245–8 | 89–98 | 11–12 |
| 2 | 2-Chlorophenyl | 216–20 | 98–101 | 11–12 |
| 3 | 3-Chlorophenyl | 223–5 | 31–33 (a) | 2–3 |
| 4 | 4-Chlorophenyl | 259–63 | 71–84 | 16–21 |
| 5 | 2-Bromophenyl | 228–32 | 84–91 | 7–7 |
| 6 | 2-Iodophenyl | 249–52 | 100–100 | 5–5 |
| 7 | 2-Fluorophenyl | 168–70 | 89–93 | 7–9 |
| 8 | 2-(Trifluoromethyl)phenyl | 293–5 | 94–96 | 15–17 |
| 9 | 3-(Trifluoromethyl)phenyl | 174–9 | 81–83 | 6–6 |
| 10 | 4-(Trifluoromethyl)phenyl | 193–7 | 62–65 | 15–17 |
| 11 | 2-Methylphenyl | 225–7 | 97–98 | 11–12 |
| 12 | 3-Methylphenyl | 214–18 | 38–46 | 15–18 |
| 13 | 4-Methylphenyl | 235–9 | 87–94 | 11–12 |
| 14 | 2-Methoxyphenyl | 149–51 | 85–86 | 11–12 |
| 15 | 4-Methoxyphenyl | 242–3 | 93–93 | 11–12 |
| 16 | 2-(Hydroxymethyl)phenyl | 222–4 | 57–57 | 15–17 |
| 17 | 2-Chloro-5-methylphenyl | 260–3 | 95–96 | 7–9 |
| 18 | 2-Chloro-5-(trifluoromethyl)phenyl | 256–9 | 91–93 | 3–4 |
| 19 | 2,5-Dichlorophenyl | 260–3 | 90–98 | 7–9 |
| 20 | 2,6-Dichlorophenyl | 256–8 | 86–90 | 20–23 |
| 21 | 2,5-Dimethylphenyl | 233–8 | 86–89 | 2–3 |
| 22 | 2-Cholor-4-fluorophenyl | 262–4 | 90–91 | 10–11 |
| 23 | 4-Chloro-3-(trifluoromethyl)phenyl | 230–2 | 74–78 | 7–10 |
| 24 | 3,5-bis(trifluoromethyl)phenyl | <300 | 73–83 | 7–7 |
| 25 | 3,4-Methylenedioxyphenyl | 244–5 | 69–78 | 7–10 |
| 26 | 1-Naphthyl | 274–6 | 93–94 | 11–12 |
| 27 | 3,4-Dimethoxyphenyl | (a)b.p. 118–21/1.5 mm | 75–84(b) | 11–13 |
| 28 | 4-Hydroxyphenyl | 192–4 | 60 (b)(c) | 11–13 |
| 29 | 3-Methoxy-4-hydroxyphenyl | 220°(d) | 61 (b)(c) | 11–13 |
| 30 | 3-Hydroxy-4-methoxyphenyl | 195–8 | 85–93(b) | 11–13 |
| 31 | 3,4,5-Trimethoxyphenyl | 216–7 | 46–48(b) | 11–13 |
| 32 | 2,4,5-Trimethoxyphenyl | 211–3 | 74–74(b) | 11–13 |

(a) tested as the free base
(b) clots were aged over-night instead of 1 hour
(c) tested at half the dose (0.5 mg./ml. of plasma)

Although the above compounds were used for the indicated tests in the form of their hydrochlorides, their free base and other non-toxic salts thereof produce equal results when used in molar equivalents. Among the non-toxic acid addition salts, the citrate, phosphate, acetate and succinate salts are preferred.

EXAMPLE 33

By using the procedure of the preceding examples, the compound of Example 15 was used in various amounts together with a constant amount of urokinase. A urokinase solution giving 6 percent lysis (13.3 CTA units per ml. of plasma) was tested within a range of from 0.1 to 10 mg. of 4-methoxybenzylamine (0.8–80 micromoles) per milliliter of plasma. Significant urokinase enhancement was observed over the whole range. For example, with 4 mg./ml. of 4-methoxybenzylamine hydrochloride, 97 percent lysis was observed; at 0.25 mg./ml., 33 percent lysis occurred and at 1 mg./ml., lysis is 100 percent of theory, i.e., the clots dissolved completely within 20 hours.

Almost identical results were observed with the hydrochlorides of Examples 1, 7, 14 and 18. Also, when the constant urokinase solution contained 9.3 CTA units per ml. of plasma, the enhancement with various amounts of benzylamine derivatives was similarly dramatic. For example, by using 1 mg./ml. (4 micromoles) of the hydrochloride of the compound of Example 18, 30 percent lysis was observed; when using 4 mg. of the same salt per ml. of plasma together with the above urokinase solution, 100 percent lysis took place.

EXAMPLE 34

In an anesthesized dog, the jugular vein is isolated. By passing an electric current across the vein through a pair of electrodes placed on the outside of the vein, blood flow reduces rapidly and finally stops due to the formation of blood clots.

The dog is then systemically treated with a solution containing 535 CTA units of urokinase and 54.3 mg. of 2-chloro-5-trifluoromethyl)benzylamine hydrochloride (0.22 millimoles) per milliliter of an aqueous carrier containing 0.9 percent sodium chloride, 0.5 percent human serum albumine and 0.1 percent disodium Versenate (disodium salt of edetic acid): the solution is administered intravenously through infusion into the opposite jugular vein at a rate of 0.5 ml./hr. for 3 days. Blood flow through the jugular vein is hereby restored and is observed for 4 days following infusion during which time it remains normal. When giving the above amount of urokinase alone, the clot in the vein does not dissolve.

When the above benzylamine derivative is replaced by 0.3 millimoles (42.9 mg.) of unsubstituted benzylamine hydrochloride under otherwise identical in vivo conditions, the same lasting blood flow restoration is observed.

Other vehicles can be used in place of the above saline solution; for instance, water, glucose or mannitol solutions or gelatine or tragacanth solutions produce equally good results.

The above experiments clearly show the excellent potentiation of the lysing effect of urokinase with the defined benzylamine derivatives. Urokinase is actually used in extremely small amounts and only relatively small amounts of the benzylamines are required for the desired clot lysing effect. It will be readily understood by those skilled in the art that quantities of urokinase much smaller than those mentioned above may be employed since an activator (acting as urokinase) is already present in the blood vessels of animals. The above examples also show that the fibrinolytic activity is enhanced in the in vivo system for which the new compounds are designed: the blood clots used above are basically identical to those formed in the blood of warm-blooded animals.

For treatment of a clot actually present in the blood vessel of a warm-blooded animal, the compound of this invention is administered parenterally or orally, preferably intravenously. The process of the present invention can be carried out in several ways. For instance, the enhancer can be administered together with urokinase or it can be administered prior to the administration of urokinase and, if desired, may be followed by subsequent doses of the enhancer by parenteral and/or oral administration. In animals, an excellent administration schedule is as follows: the above benzylamine derivative is administered intravenously or orally after establishing that a clot is present in the blood stream. Subsequently or simultaneously, one-half the usual dose of urokinase or less is administered intravenously and, if desired, one or more further doses of the above enhancer is given on subsequent days, for instance, by infusion extended over a period of several days.

The benzylamines described above are generally prepared by hydrogenating the corresponding cyanobenzenes. Most of the specific compounds shown above have been reported in the literature and are commercially available. In some instances, the compounds used above were prepared by chemical or catalytic reduction of the corresponding nitriles. For instance, the compounds of Examples 17, 18, 22 and 23 were made according to the following procedure described here for the compound of Example 18:

To a slurry of 38 g. of lithium aluminum hydride in 2 liters of anhydrous diethyl ether in a 5-liter 3-necked round-bottom flask equipped with a stirrer and an efficient reflux condenser is slowly added a solution of 206 g. of 4-chloro-3-cyanobenzotrifluoride in 1.5 liters of anhydrous ether. The rate of addition is controlled in such a way that the slurry remains under gentle reflux. When the addition is complete, external heat is applied to maintain reflux for another 90 minutes. The cooled slurry is then slowly and cautiously treated with 39 ml. of water to decompose any excess of lithium aluminum hydride, then with 38 ml. of a 12.5 percent aqueous sodium hydroxide solution and finally with another 39 ml. of water. The resulting mixture is stirred vigorously for several minutes and filtered. The yellow filtrate is dried over magnesium sulfate and filtered again. The ether solution is then stirred in an ice bath while anhydrous hydrogen chloride gas is bubbled into the solution until no further precipitation occurs. The precipitate is then collected and dissolved in hot 2-propanol containing 20 percent menthanol. The hot solution is treated with charcoal and filtered hot. To the filtrate is added cyclohexane until crystallization begins. The mixture is allowed to stand for several hours and the formed shiny white crystalline plates of pure 2-chloro-5-trifluoromethylbenzylamine hydrochloride are collected on a filter; they melt at 256°–259° C. with decomposition.

The compound of Example 24 is prepared in the following manner: a solution of 25 g. of 3,5-bis(trifluoromethyl)benzonitrile in acidic aqueous ethanol is catalytically hydrogenated by the method of Freifelder, et al. (J. Pharm. Sci., volume 54, page 1204 of 1965). The catalyst is then removed and the solution is freed of ethanol under vacuum and distributed between water and methylene chloride. The aqueous layer is washed with fresh methylene chloride, separated and made alkaline with an aqueous potassium hydroxide solution. The alkaline solution is extracted with portions of chloroform. The combined chloroform solutions are washed with water, dried and acidified with gaseous hydrogen chloride. The precipitated product is recrystallized from 2-propanol and ether producing pure white needles of 3,5-bis(trifluoromethyl)benzylamine hydrochloride which do not melt or char when heated in an open capillary tube, but sublime rapidly above 300° C.

We claim:

1. The method of enhancing the lysis of a vertebrate blood clot which comprises contacting said clot with urokinase in an amount that produces about 10 percent lysis and a non-toxic amount of a benzylamine of the formula

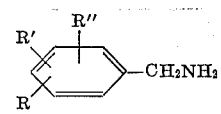

wherein R is hydrogen, halogen, methyl, trifluoromethyl or methoxy and R' is hydrogen, halogen, hydroxy, methoxy, methyl or trifluoromethyl or wherein R and R' together form a second benzene ring fused to the phenyl ring at its 2- and 3-positions or a methylenedioxy ring attached to the phenyl ring at its 3- and 4-positions and R" is methoxy when R and R' both are methoxy or hydroxy and hydrogen in all other instances; or a non-toxic acid addition salt thereof wherein 0.1–5 micromoles of said benzylamine is employed per CTA unit of urokinase activity.

2. The process of claim 1 wherein the blood clot is first contacted with said benzylamine and subsequently with urokinase.

3. A composition for accelerating the lysis of a vertebrate blood clot consisting essentially of urokinase and a non-toxic amount of a benzylamine of the formula

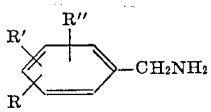

wherein R is hydrogen, halogen, methyl, trifluoromethyl or methoxy and R' is hydrogen, halogen, methyl, methoxy, hydroxy or trifluoromethyl or wherein R and R' together form a second benzene ring fused to the phenyl ring at its 2- and 3-positions or a methylenedioxy ring attached to the phenyl ring at its 3- and 4-positions and R" is methoxy when R and R' both are methoxy or hydroxy and hydrogen in all other instances; or a non-toxic acid addition salt thereof in which 0.1–5 micromoles of said benzylamine per CTA unit of urokinase activity is present.

4. The composition of claim 3 wherein R is a chlorine substituent in the 2-position.

5. The composition of claim 4 wherein said benzylamine is 2-chloro-5-(trifluoromethyl)benzylamine.

6. The composition of claim 3 wherein said benzylamine is 2-fluorobenzylamine.

7. The composition of claim 3 wherein said benzylamine is 4-methoxybenzylamine.

8. The composition of claim 3 wherein the ratio between said benzylamine and urokinase is between 0.2 and 5.0 micromoles of said benzylamine per CTA unit of urokinase activity.

9. The composition of claim 8 in unit dosage form together with a pharmaceutically acceptable carrier.

10. The composition of claim 9 wherein said carrier is a substantially isotonic saline solution.

* * * * *